United States Patent
Sharma et al.

(10) Patent No.: US 8,973,374 B2
(45) Date of Patent: *Mar. 10, 2015

(54) BLADES IN A TURBINE SECTION OF A GAS TURBINE ENGINE

(75) Inventors: Om P. Sharma, South Windsor, CT (US); Michael F. Blair, Manchester, CT (US); Frederick M. Schwarz, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 561 days.

This patent is subject to a terminal disclaimer.

(21) Appl. No.: 13/340,019

(22) Filed: Dec. 29, 2011

(65) Prior Publication Data

US 2012/0174593 A1      Jul. 12, 2012

Related U.S. Application Data

(60) Continuation-in-part of application No. 13/163,304, filed on Jun. 17, 2011, now Pat. No. 8,516,793, which is a division of application No. 11/850,787, filed on Sep. 6, 2007, now Pat. No. 7,984,607.

(51) Int. Cl.
   *F02C 3/04*     (2006.01)
   *F02C 3/00*     (2006.01)
   *F01D 5/14*     (2006.01)

(52) U.S. Cl.
   CPC . *F02C 3/00* (2013.01); *F01D 5/142* (2013.01); *F05D 2230/50* (2013.01); *F05D 2260/202* (2013.01)
   USPC .............................. 60/791; 60/268; 415/199.5

(58) Field of Classification Search
   USPC ................... 60/268, 39.162, 39.15, 791, 792; 415/199.5, 115; 416/97 R, 97 A
   See application file for complete search history.

(56) References Cited

U.S. PATENT DOCUMENTS

| | | | |
|---|---|---|---|
| 637,725 A | 11/1899 | Gardam et al. | |
| 3,953,148 A | 4/1976 | Seippel et al. | |
| 4,968,216 A | 11/1990 | Anderson et al. | |
| 5,169,288 A | 12/1992 | Gliebe et al. | |
| 5,486,091 A | 1/1996 | Sharma | |
| 5,591,002 A * | 1/1997 | Cunha et al. | 415/115 |
| 5,943,856 A | 8/1999 | Lillibridge et al. | |
| 6,036,438 A | 3/2000 | Imai | |

(Continued)

FOREIGN PATENT DOCUMENTS

| | | |
|---|---|---|
| EP | 1044321 | 10/2002 |
| JP | 2003157884 | 5/2003 |

(Continued)

OTHER PUBLICATIONS

International Search Report and Written Opinion for International Application No. PCT/US2012/070861 completed on Aug. 15, 2013.

(Continued)

*Primary Examiner* — Andrew Nguyen
(74) *Attorney, Agent, or Firm* — Carlson, Gaskey & Olds, P.C.

(57) ABSTRACT

An exemplary gas turbine engine includes a turbine section operative to impart rotational energy to a compressor section. The turbine section includes at least a low-pressure turbine and a high-pressure turbine, and a number of stages in the low pressure turbine is from three to five.

11 Claims, 3 Drawing Sheets

(56) References Cited

U.S. PATENT DOCUMENTS

| | | | |
|---|---|---|---|
| 6,079,197 A * | 6/2000 | Attia | 60/774 |
| 6,183,192 B1 * | 2/2001 | Tressler et al. | 415/115 |
| 6,195,983 B1 | 3/2001 | Wadia et al. | |
| 6,260,794 B1 | 7/2001 | Rowe | |
| 6,554,564 B1 | 4/2003 | Lord | |
| 6,578,363 B2 * | 6/2003 | Hashimoto et al. | 60/806 |
| 6,840,048 B2 * | 1/2005 | Han et al. | 60/772 |
| 7,806,651 B2 | 10/2010 | Kennepohl et al. | |
| 7,836,703 B2 * | 11/2010 | Lee et al. | 60/806 |
| 7,926,289 B2 | 4/2011 | Lee et al. | |
| 2003/0046934 A1 * | 3/2003 | Sherwood | 60/722 |
| 2006/0034691 A1 | 2/2006 | Lawlor et al. | |
| 2011/0247343 A1 | 10/2011 | Sharma et al. | |

FOREIGN PATENT DOCUMENTS

| | | | |
|---|---|---|---|
| WO | 9003666 | 4/1990 | |
| WO | WO2005100750 | * 10/2005 | F01D 25/00 |

OTHER PUBLICATIONS

International Preliminary Report of Patentability for Application No. PCT/US2012/070861, mailed Jul. 10, 2014. International Preliminary Report of Patnetability for Application No. PCT/US2012/070233, mailed Jul. 10, 2014.

* cited by examiner

BLADES IN A TURBINE SECTION OF A GAS TURBINE ENGINE

CROSS-REFERENCE TO RELATED APPLICATIONS

This application is continuation-in-part of U.S. patent application Ser. No. 13/163304, which issued as U.S. Pat. NO. 8,516,783 and was filed on 17 Jun. 2011. U.S. patent application Ser. No. 13/163,304 is a divisional of U.S. patent application Ser. No. 11/850,787, which issued as U.S. Pat. No. 7,984,607 and was filed 6 Sep. 2007. U.S. patent application Ser. Nos. 13/163304 and 11/850,787 are both hereby incorporated by reference.

BACKGROUND

1. Technical Field

The disclosure generally relates to gas turbine engines.

2. Description of the Related Art

Turbine durability for high inlet temperature/high fuel-to-air ratio gas turbine engine designs can be compromised by gas path temperature and/or chemical species non-uniformities occurring at the exit of a combustor. Chemical species variation is particularly relevant to high fuel-to-air ratio turbine designs in that the combustion process may not be completed at the exit plane of the combustor section with the result that partial products of reaction (PPRs) enter the turbine section. The anticipated presence of such temperature non-uniformities contributes to the use of conservative cooling designs for the turbine in order to prevent damage that can be caused by a failure to account for such temperature/PPR's non-uniformities.

SUMMARY

A gas turbine engine according to an exemplary embodiment of the present disclosure includes, among other possible things, a turbine section operative to impart rotational energy to a compressor section. The turbine section includes at least a low-pressure turbine and a high-pressure turbine. A number of stages in the low pressure turbine is from three to five.

In a further non-limiting embodiment of the foregoing gas turbine engine embodiment, the low-pressure turbine has exactly four stages.

In a further non-limiting embodiment of either of the foregoing gas turbine engine embodiments, the high-pressure turbine has exactly two stages.

In a further non-limiting embodiment of any of the foregoing gas turbine engine embodiments, the turbine section has a first set of vanes positioned adjacent a combustion section and a first set of rotatable blades positioned downstream of and adjacent to the first set of vanes. A number of vanes of the first set of vanes exceeds a number of blades of the first set of blades.

In a further non-limiting embodiment of any of the foregoing gas turbine engine embodiments, a first stage of the high-pressure turbine comprises the first set of vanes and the first set of blades.

A gas turbine engine according to another exemplary embodiment of the present disclosure includes, among other possible things, a turbine section operative to impart rotational energy to a compressor section. The turbine section includes at least a high-pressure turbine having from three to five stages.

In a further non-limiting embodiment of the foregoing gas turbine engine embodiment, the high-pressure turbine has a first set of vanes positioned adjacent a combustion section and a first set of rotatable blades positioned downstream of and adjacent to the first set of vanes. A number of vanes of the first set of vanes exceeds a number of blades of the first set of blades.

A method of operating a gas turbine engine according to an exemplary aspect of the present disclosure includes, among other possible things, providing a gas turbine engine having a combustion section and a turbine section. The turbine section has a first set of vanes and a first set of blades. The first set of blades being located downstream from and adjacent to the first set of vanes. The turbine section includes a high-pressure turbine and a low-pressure turbine. The low-pressure turbine having from three to five stages.

In a further non-limiting embodiment of the foregoing method of operating a gas turbine engine, the method includes completing a combustion reaction along a gas flow path prior to a plane defined by downstream portions of the first set of blades.

In a further non-limiting embodiment of either of the foregoing methods of operating a gas turbine engine, a vane-blade count ratio of the turbine stage is greater than unity, and completing the combustion reaction comprises mixing combustion products from the combustion section using the vanes of the first set of vanes.

In a further non-limiting embodiment of any of the foregoing methods of operating a gas turbine engine, the engine is operative such that cooling air provided to the first set of vanes reacts with combustion products from the combustion section in order to complete the combustion reaction.

In a further non-limiting embodiment of any of the foregoing methods of operating a gas turbine engine, the method includes film-cooling the vanes of the first set of vanes.

In a further non-limiting embodiment of any of the foregoing methods of operating a gas turbine engine, the gas turbine engine further comprises a second set of vanes located downstream from the first set of blades, and the second set of vanes is film-cooled to a lesser extent than that provided to the first set of vanes.

DESCRIPTION OF THE FIGURES

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Gas turbine engine systems and related methods involving vane-blade count ratios greater than unity are provided, several exemplary embodiments of which will be described. In this regard, an increased vane count could increase the probability that a temperature/PPR's nonuniformity ("hot and/or fuel-rich streak") will mix with cooler gases and, therefore, dissipate before propagating beyond the rotating blades of the first stage of the turbine. In some embodiments, the cooler gases used for dissipating such a hot streak are provided as cooling air, which is provided for film-cooling the vanes of the first turbine stage. In some embodiments, the vane and blade counts deviate from a nominal number so that overall parasitic drag and weight directly attributable to the vanes and blades are comparable to a gas turbine engine containing an equal number of vanes and blades. For example, in a first stage turbine design incorporating forty-eight (48) vanes and sixty-two (62) blades, the number of vanes could be increased to fifty six (48+8=56), whereas the number of blades could be decreased to fifty four (62−8=54). It should be noted that increasing the number of vanes can potentially enhance mixing of the gases departing the combustion section, thereby reducing the requirement for conservative cooling of downstream vanes. Thus, an overall weight reduction may be achieved by reducing the requirements of cooling air in some embodiments. Additionally, aerodynamic efficiency may be improved as an increased number of vanes can yield higher levels of unsteady flow in the downstream rotor passages. As such the formation of rotor passage secondary flow vortices and losses can be inhibited.

Figure 1:
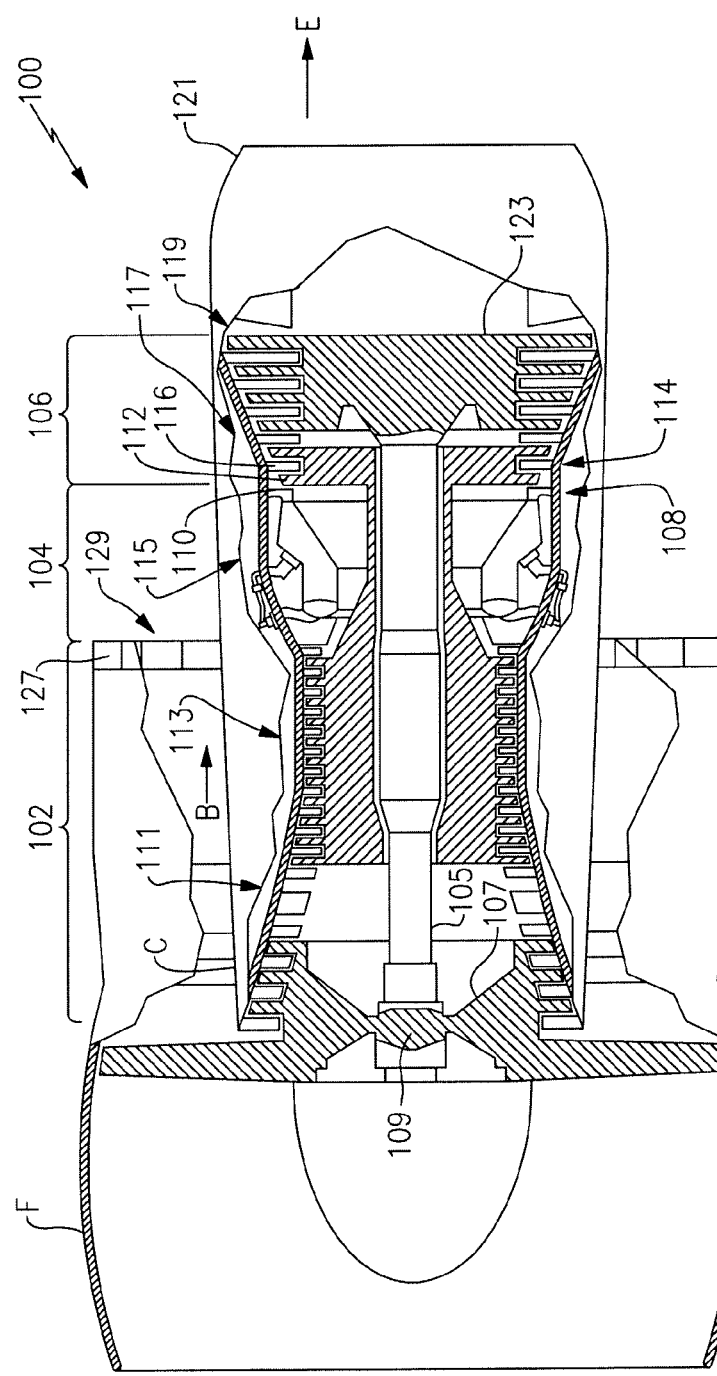
FIG. 1 is a schematic diagram depicting an embodiment of a gas turbine engine.

Referring now in detail to the drawings, FIG. 1 is a schematic diagram depicting an embodiment of a gas turbine engine 100. As shown in FIG. 1, engine 100 includes a compressor section 102, a combustion section 104 and a turbine section 106. Notably, engine 100 is a turbofan although it should be noted that the concepts described herein should not be considered limited to use with gas turbine engines configured as turbofans.

In one disclosed, non-limiting embodiment, the engine 100 bypass ratio is greater than about six (6), with an example embodiment being greater than ten (10). In such the embodiment, a low spool 105 of the engine 100 drives a fan section 107 of the engine 100. The fan section 107 drives the low spool 105 either directly or through a gear train 109. Turbine section 106 incorporates multiple stages, each of which includes a set of stationary vanes and a corresponding set of rotating blades. In this regard, a first stage 108 of the turbine section includes a first set of vanes 110 and a first set of blades 112. The first stage of the turbine section is located immediately downstream of the combustion section and immediately upstream of a second stage 114 of the turbine, which includes a second set of stationary vanes 116.

In one disclosed embodiment, the engine 100 bypass ratio is greater than about ten (10:1), a diameter of a fan nacelle F is significantly larger than that of a low pressure compressor 111, and the low pressure turbine 119 has a pressure ratio that is greater than 5:1.

The example gear train 109 may be an epicyclic gear train, such as a planetary gear system or other gear system with a gear reduction ratio of greater than about 2.5:1. The example low pressure turbine 119 drives the fan section 107 through the gear train 109.

It should be understood, however, that the above parameters are only exemplary of some embodiments of a geared architecture engine and that the present disclosed embodiments are applicable to other gas turbine engines including direct drive turbofans.

In the engine 100, airflow enters the fan nacelle F, which at least partially surrounds the core nacelle C. The fan nacelle F communicates airflow into the core nacelle C to a low pressure compressor 111. Core airflow compressed by the low pressure compressor 111 and a high pressure compressor 113 is mixed with the fuel in a combustor 115, ignited, and burned. The resultant products of combustion are expanded through a high pressure turbine 117 and low pressure turbine 119. The turbines 117, 119 are rotationally coupled to the compressors 111, 113 respectively to drive the compressors 111, 113 in response to the expansion of the products of combustion. A core engine exhaust E exits the core nacelle C through a core nozzle 121 defined between the core nacelle C and a tail cone 123.

In this example, the stages 108 and 114 are in the high pressure turbine 117. Utilizing a low number of stages facilitates a lightweight and operationally efficient engine architecture. It should be appreciated that a low number of stages in the low pressure turbine 119 contemplates, for example, from three to five stages.

The gear train 109 operationally effectuates the significantly reduced number of stages within the low pressure turbine 119. The example epicyclic gear train 109 is a planetary gear system or other gear system with a gear reduction ratio of greater than about 2.3 and the low pressure turbine 18 has a pressure ratio that is greater than about 5.

Low pressure turbine 119 pressure ratio is pressure measured prior to inlet of low pressure turbine 119 as related to the pressure at the outlet of the low pressure turbine 119 prior to exhaust.

Thrust is a function of density, velocity, and area. One or more of these parameters can be manipulated to vary the amount and direction of thrust provided by the bypass flow B.

In an example embodiment, a Variable Area Fan Nozzle ("VAFN") 127 operates to effectively vary the area of the fan nozzle exit area 129 to selectively adjust the pressure ratio of a bypass flow B in response to a controller. Low pressure ratio turbofans are desirable for their high propulsive efficiency. However, low pressure ratio fans may be inherently susceptible to fan stability/flutter problems at low power and low flight speeds. The VAFN 127 allows the engine 100 to change to a more favorable fan operating line at low power, avoiding the instability region, and still provide the relatively smaller nozzle area necessary to obtain a high-efficiency fan operating line at cruise.

A significant amount of thrust is provided by the bypass flow B due to the high bypass ratio. The fan section F of the engine 100 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without the Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.51]. The "Low corrected fan tip speed" as disclosed herein according to one non-limiting embodiment is less than about 1150 ft/second.

As the fan blades within the fan section 107 are efficiently designed at a particular fixed stagger angle for an efficient cruise condition, the VAFN 42 is operated to effectively vary the fan nozzle exit area 129 to adjust fan bypass air flow such that the angle of attack or incidence on the fan blades is maintained close to the design incidence for efficient engine operation at other flight conditions, such as landing and take-off to thus provide optimized engine operation over a range of flight conditions with respect to performance and other operational parameters such as noise levels.

Figure 2:
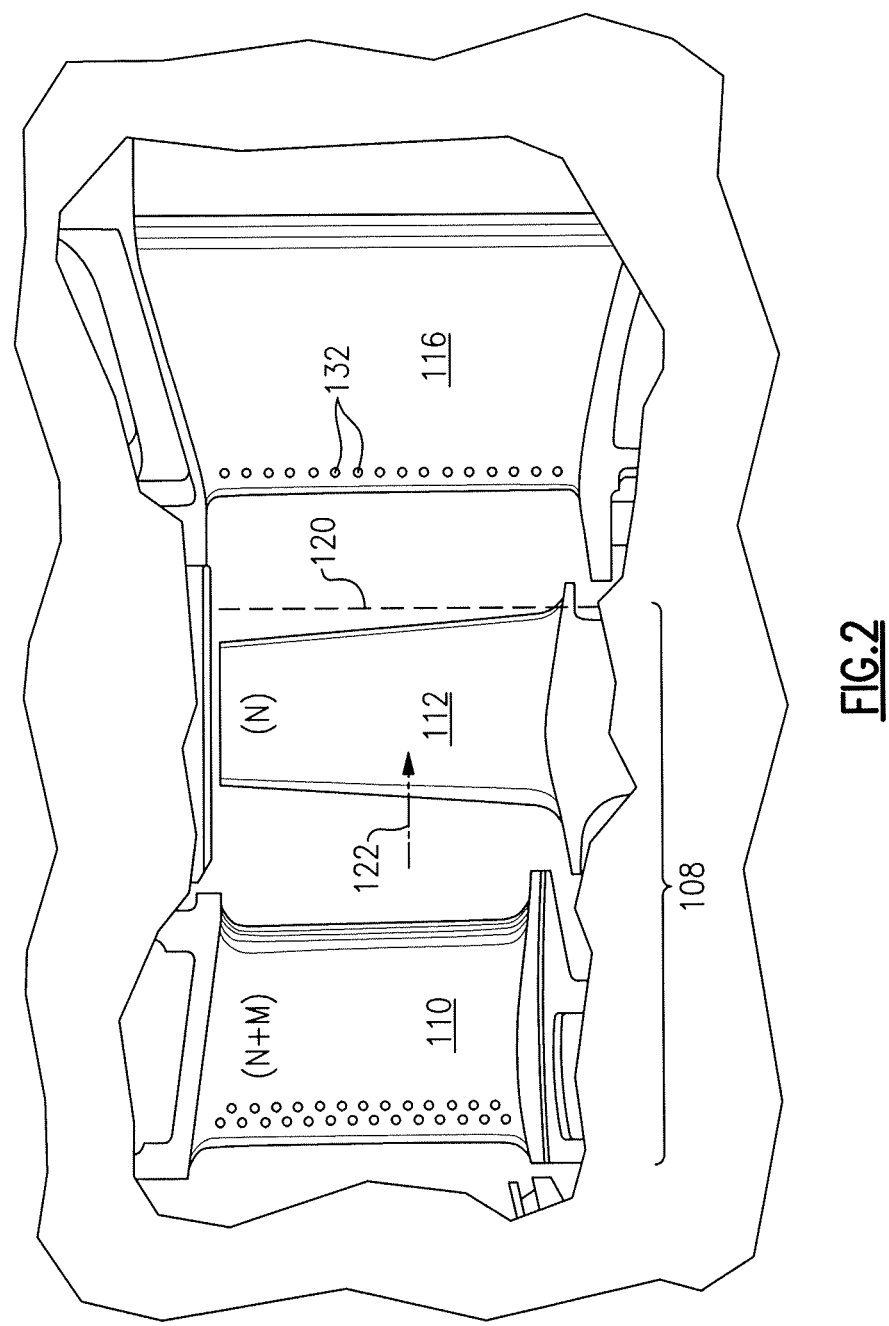
FIG. 2 is a schematic diagram depicting the embodiment of FIG. 1, showing detail of the first and second stages of the turbine section.

As shown in FIG. 2, blades 112 are located downstream of vanes 110, whereas vanes 116 are located downstream of blades 112. Notably, downstream portions of the blades 112 define an exit plane 120. Notably, interaction of gas 122 flowing along the gas path defined by the vanes and blades causes combustion products to mix and complete a combustion reaction prior to traversing the exit plane of the first set of blades 112. This is accomplished, at least in part, by providing a greater number of vanes 110 than there are blades 112, i.e., the vane-blade count ratio of the first turbine stage is greater than unity (1).

In the embodiment of FIGS. 1 and 2, vanes 110 and 116 incorporate film-cooling holes that direct cooling air for film-cooling the vanes. By way of example, vane 110 includes cooling holes 130, and vane 116 includes cooling holes 132. Note that although the number of cooling holes in vane 110 exceeds the number of cooling holes in vane 116, various other numbers and arrangements of cooling holes can be provided in other embodiments.

Because of work extraction in a first turbine stage, the temperature of gas is reduced at exit plane of that stage relative to the temperature at the entrance of the first vanes. As a result, for conventional turbine designs, cooling requirements for the downstream vanes are usually much lower than the cooling requirements for the first vanes. However, for high-fuel-to-air ratio turbine designs (i.e., designs that exhibit significant PPR concentrations at the inlet to the first stage), the oxygen included in the cooling air provided in the first stage 108 completes the combustion reaction and can significantly increase the temperature of gas 122 temperature at exit plane 120. The degree of circumferential and radial uniformity of this hot and/or fuel-rich streak temperature increase is a factor that should be considered for the cooling design of vanes 116. If the hot and/or fuel-rich streaks are highly concentrated (non-uniform temperature at station 120), then all of the vanes 116 should be designed to accommodate the hottest possible streak.

However, if the hot and/or fuel-rich streaks are diffused by the first stage 108 (a highly uniform temperature at station 120), then the vanes 116 can be designed to accommodate a lower peak temperature. This can result in a weight reduction of the gas turbine engine as lighter and/or fewer components associated with routing of the cooling air may be provided.

Figure 3:
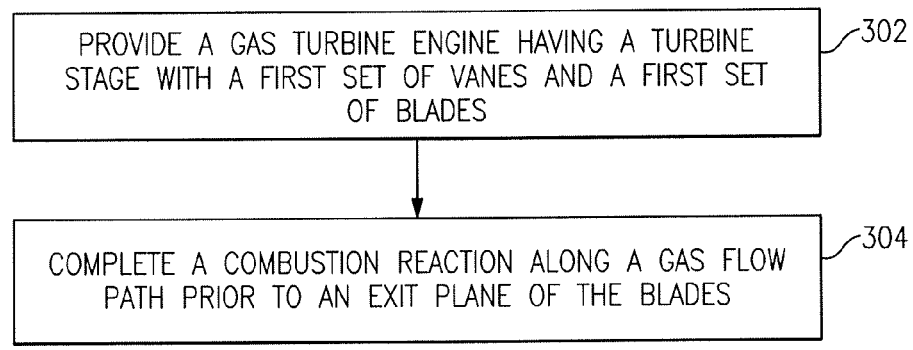
FIG. 3 is a flowchart depicting an embodiment of a method for operating a gas turbine engine.

In this regard, FIG. 3 is a flowchart depicting an embodiment of a method for operating a gas turbine engine. As shown in FIG. 3, the method may be construed as beginning at block 302, in which a gas turbine engine having a combustion section and a turbine stage is provided.

Notably, the turbine stage includes a first set of vanes and a first set of blades, with the first set of blades being located downstream from and adjacent to the first set of vanes. In block 304, a combustion reaction is completed along a gas flow path prior to a plane defined by downstream portions of the first set of blades. In some embodiments, design of such a first stage incorporates, through the use of both CFD analysis and empirical correlations, any combination of (a) Vane(N)/Blade(N) ratio, (b) vane and/or blade film-cooling schemes or (c) vane and/or blade aerodynamic designs such that temperature and PPR's nonuniformities at the exit plane of the turbine stage are reduced, e.g., minimized or eliminated.

Figure 4:
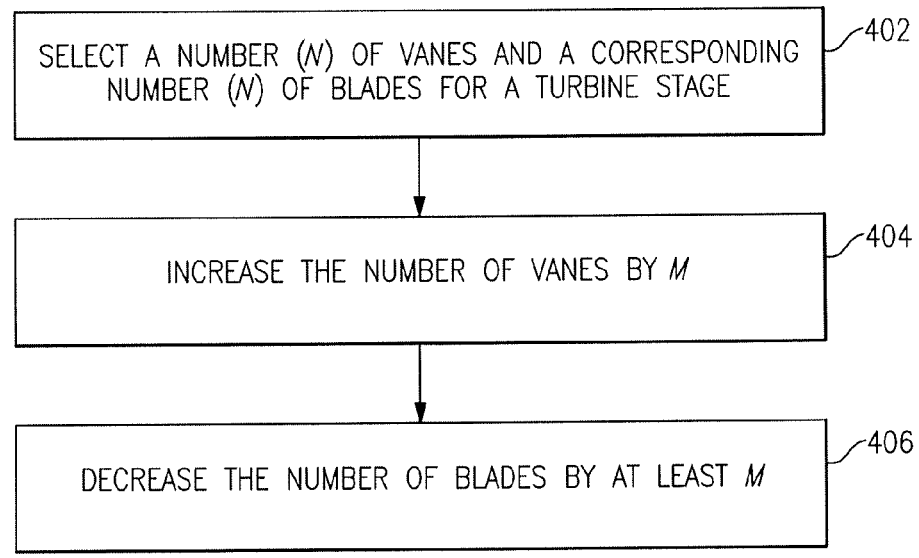
FIG. 4 is a flowchart depicting an embodiment of a method for designing a gas turbine engine.

FIG. 4 is a flowchart depicting another embodiment of a method. Specifically, the flowchart of FIG. 4 involves a method for designing a gas turbine engine. That method may be construed as beginning at block 402, in which a number (N) of vanes and a corresponding number (N) of blades for a turbine stage of a gas turbine engine are selected. In block 404, the number of the vanes is increased by M. In block 406, the number of blades is decreased by at least M such that the number of vanes of the turbine stage exceeds the number of blades of the turbine stage. In some embodiments, the turbine stage is a first turbine stage downstream of a combustor.

A set of numerical experiments were conducted to quantify the impact of change in the number of first vanes on the temperature non-uniformity at the exit of a representative turbine stage. These simulations were conducted by changing the number of airfoils in the vane row while holding the airfoil count for the rotor row constant. The ratio of vanes to blades in these studies were 2/3, 1/1 and 3/2. The temperature at inlet to the stage was held constant at a typical combustor exit temperature value while the metal temperature for the vane was maintained at a constant value consistent with the airfoil durability requirements. The rotor airfoils and endwalls, however, were maintained at adiabatic wall temperatures. An unsteady 3-D ReynoldsAveraged-Navier-Stokes CFD code was used to conduct these simulations. Results from these simulations indicated that the absolute temperature distortion at the exit of the rotor was about 60%, 30% and 16% of the inlet distortion to the rotor, which was constant for the above three numerical experiments. These simulations clearly indicate that increasing the number of vanes relative to the blades enhances mixing between the hot and cold stream in the rotor passages.

Interrogation of numerical data from these simulations also indicated that the loss levels in the rotor passages were also reduced as the number of vanes was increased. In addition, increasing the number of vanes was also found to reduce the hot spot temperature on the rotor airfoil pressure side indicating that the cooling air in the rotor passages may also be favorably impacted by increased vane count.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A gas turbine engine comprising:
a turbine section operative to impart rotational energy to a compressor section,
wherein the turbine section includes at least a low-pressure turbine and a high-pressure turbine, and a number of stages in the low pressure turbine is from three to five, wherein the turbine section has a first set of vanes positioned adjacent a combustion section and a first set of rotatable blades positioned downstream of and adjacent to the first set of vanes, and a number of vanes of the first set of vanes exceeds a number of blades of the first set of blades.

2. The gas turbine engine of claim 1, wherein the low-pressure turbine has exactly four stages.

3. The gas turbine engine of claim 1, wherein the high-pressure turbine has exactly two stages.

4. The gas turbine engine of claim 1, wherein a first stage of the high-pressure turbine comprises the first set of vanes and the first set of blades.

5. A gas turbine engine comprising:
a turbine section operative to impart rotational energy to a compressor section,
wherein the turbine section includes at least a high-pressure turbine having from three to five stages, wherein the high-pressure turbine has a first set of vanes positioned adjacent a combustion section and a first set of rotatable blades positioned downstream of and adjacent to the first set of vanes, wherein a number of vanes of the first set of vanes exceeds a number of blades of the first set of blades.

6. A method for operating a gas turbine engine comprising:
providing a gas turbine engine having a combustion section and a turbine section, the turbine section having a first set of vanes and a first set of blades, the first set of blades being located downstream from and adjacent to the first set of vanes, wherein the turbine section includes a high-pressure turbine and a low-pressure turbine, the low-pressure turbine having from three to five stages, wherein the high-pressure turbine has a first set of vanes positioned adjacent a combustion section and a first set of rotatable blades positioned downstream of and adjacent to the first set of vanes, wherein a number of vanes of the first set of vanes exceeds a number of blades of the first set of blades.

7. The method of claim 6, including completing a combustion reaction along a gas flow path prior to a plane defined by downstream portions of the first set of blades.

8. The method of claim 6, wherein:
completing a combustion reaction comprises mixing combustion products from the combustion section using the vanes of the first set of vanes.

9. The method of claim 6, wherein the engine is operative such that cooling air provided to the first set of vanes reacts with combustion products from the combustions section in order to complete the combustion reaction.

10. The method of claim 6, further comprising film-cooling the vanes of the first set of vanes.

11. The method of claim 10, wherein:
the gas turbine engine further comprises a second set of vanes located downstream from the first set of blades; and
the second set of vanes is film-cooled to a lesser extent than that provided to the first set of vanes.

* * * * *

UNITED STATES PATENT AND TRADEMARK OFFICE
CERTIFICATE OF CORRECTION

| | | |
|---|---|---|
| PATENT NO. | : 8,973,374 B2 | Page 1 of 1 |
| APPLICATION NO. | : 13/340019 | |
| DATED | : March 10, 2015 | |
| INVENTOR(S) | : Om P. Sharma et al. | |

It is certified that error appears in the above-identified patent and that said Letters Patent is hereby corrected as shown below:

IN THE CLAIMS:

In claim 9, column 8, line 7; "combustions" should read as --combustion--

Signed and Sealed this
Twenty-fifth Day of August, 2015

Michelle K. Lee
*Director of the United States Patent and Trademark Office*